Oct. 14, 1969  J. BLUE ET AL  3,472,454

LOW VOLUME SPRAYER SYSTEM

Filed Oct. 26, 1967  4 Sheets-Sheet 1

INVENTORS
JOHN BLUE
CARL B. RIDDLE
DONELSON B. HORTON

Cushman Darby & Cushman
ATTORNEYS

Oct. 14, 1969  J. BLUE ET AL  3,472,454
LOW VOLUME SPRAYER SYSTEM
Filed Oct. 26, 1967  4 Sheets-Sheet 3

INVENTORS
JOHN BLUE
BY CARL B. RIDDLE
DONELSON B. HORTON
Cushman Darby & Cushman
ATTORNEYS

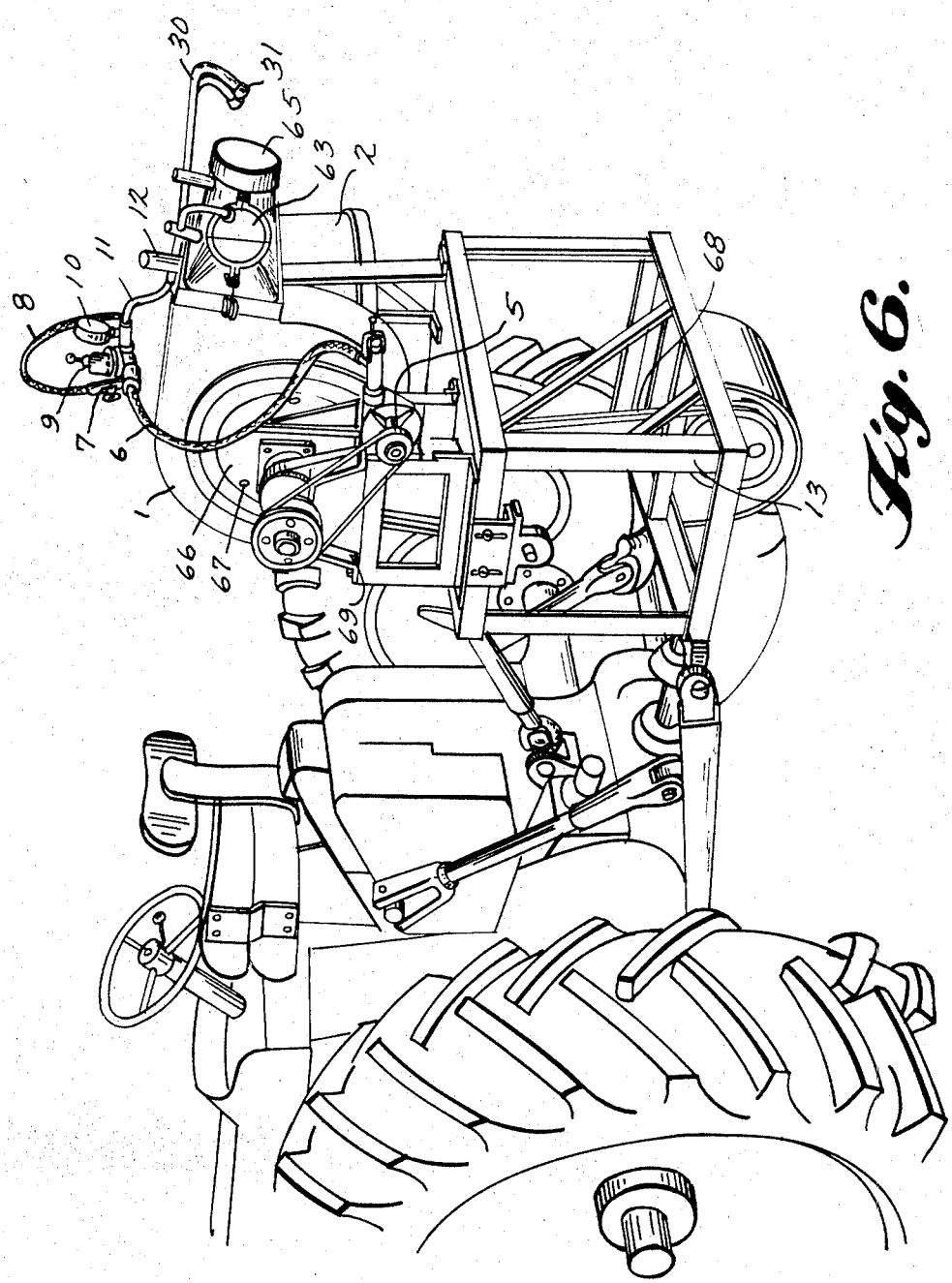

United States Patent Office 3,472,454
Patented Oct. 14, 1969

3,472,454
LOW VOLUME SPRAYER SYSTEM
John Blue, Huntsville, Carl B. Riddle, Meridianville, and Donelson B. Horton, Madison, Ala., assignors to John Blue Company, a division of Subscription Television, Inc., New York, N.Y., a corporation of Delaware
Filed Oct. 26, 1967, Ser. No. 678,356
Int. Cl. A01n 17/08
U.S. Cl. 239—77                                    20 Claims

ABSTRACT OF THE DISCLOSURE

A low volume insecticide and herbicide sprayer system which is mounted on a ground vehicle. A power-driven fan supplies a stream of air through an inflatable canvas sleeve supported from an elongated boom to a plurality of air outlets, or via a tri-manifold, where it is discharged. The spray is pumped through appropriate tubing to the air outlet areas where it is atomized, either by discharging it from a plurality of counter-flow injector nozzles at an opposed angle of 45° to the direction of airstream flow, or by discharging it readily outwardly from a rapidly rotating apertured chamber onto a screen cage which is bolted to and encases the chamber. Upon discharge the liquid spray interacts with the plurality of discrete airstreams prior to being dispersed on vegetation to be sprayed. The liquid to be sprayed is agitated by recirculation in order to ensure non-dilution of the spray concentrate.

---

The foregoing abstract is not intended to define the scope of the invention and is only provided to permit a cursory review of the gist of the invention.

BACKGROUND AND BRIEF DESCRIPTION OF THE INVENTION

This innovation relates to a low volume sprayer system for the deposition of atomized insecticides, herbicides and the like on vegetation such as plants, crops, and trees.

In the past it was common practice to deposit a rather large amount of insecticide, often as much as three to twenty gallons per acre, on vegetation in order to protect it from destruction by insects, weeds and so forth. The insecticide was applied in the form of a thoroughly mixed emulsion of water and a spray concentrate. More recently, there has been considerable interest in spraying technique which utilizes a comparatively small amount or ultra-low volume of insecticide. In this method, a concentrated material is applied in an atomized state at a dosage rate of from six to twelve fluid ounces per acre, depending upon the insects and vegetation to be treated. Some of the advantages associated with this technique include substantial reductions in sizes and weights of spray tanks to be carried by land vehicles or aircraft, or in other words, a dramatic increase in the number of acres sprayed per tank, better distribution and improved strength of the pesticide, increased insect kill, and longer residual effect of the pesticide because of less surface area exposed to the weather. While initial emphasis has been centered on the employment of low volume techniques with aircraft-mounted devices, there now appears to be an increasing amount of interest in a low volume sprayer system which can be carried by a ground vehicle. It is important, therefore, that a sprayer system be developed which is capable of fully exploiting the potentialities of low volume spray techniques.

If a low volume sprayer system is to function at maximum efficiency, several requisites must be satisfied. Due to the fact that an extremely small volume of pesticide is employed, a relatively large volume or stream of air must be made available in order to ensure that the liquid is adequately atomized and properly dispersed. Accordingly, the pattern and placement of the spray must be well controlled, while being dispersed in a comparatively wide swath. While it is normally necessary to obtain a relative wide swath, it is sometimes desirable to apply the spray in a "controlled width" pattern; for example, where a herbicide is being applied to weeds it is important that damage to nearby plants be prevented, thus necessitating a precise, localized placement of the weed killer. Moreover, it is especially desirable to keep the weight and the overall bulk sprayer system at a minimum so that it may be readily transportable, easily handled, and adapted to use in various circumstances. Moreover, where a suspension as opposed to a true solution is employed, the concentrate should not be allowed to dilute prior to use, since even a relatively small amount of dilution would result in substantial diminution of the effectiveness of the spray. Thus, an agitating system of the like should be employed in order to minimize dilution of the spray concentrate.

It is apparent therefore, that there are several problems or requisites that must be solved or satisfied in order to effectively utilize the potentialities of the low volume sprayer system.

Known sprayer apparatus, as disclosed in the prior art, is capable of partially exploiting the advantages of low volume techniques. However, no known prior art device or system appears to satisfy the above-enumerated requisites to a total exploitation of low volume spraying. As will be discussed below, a number of patents disclose device which have been developed on the general subject, but very little has been done in the development of improved systems especially directed to a solution of the rather unique problem associated with a total exploitation of the low volume spraying technique.

It is conventional, for example, to provide a power driven fan means to transmit a stream of air through a plurality of flexible air tubes or hoses to a group of air outlets on an elongated foldable spray boom, while simultaneously conducting a stream of insecticide from a supply tank through suitable tubing to a plurality of liquid discharge nozzles, and discharging the liquid in such a manner that it interacts with, and is atomized by, the discharging air stream. This procedure is illustrated in U.S. Patent 2,356,950. It is also known to deposit a mixture of atomized liquid in the form of a spray on vegetation by means of a rotating screen cage or centrifugal screen. In this instance, the cage is driven by the discharging airstream; at the same time, a liquid is supplied from a suitable tank through tubes, nozzles of the like and is deposited in the openings of the rotating screen, whereupon it is centrifugally dispersed on the vegetation which is to be sprayed. This concept is illustrated in U.S. Patent 2,979,926. It has also been suggested that it is usually preferable to direct the liquid spray generally counter to or opposite to the direction of air flow in the sprayer system when one is attempting to atomize the liquid prior to deposition on vegetation. The impression conveyed is that *any* angle of counter flow is sufficient, so long as there is counter flow. Illustrative of this concept are Australian Patent 201,728 and U.S. Patent 2,677,576.

In fact, it has been found after extensive analysis that maximum effective atomization is achieved by orienting the counter flow injector nozzles at an acute angle with respect to the longitudinal flow axis of the air outlets, in a direction opposed to that of the airflow. The preferable range of acute angles is from 30–60°, with the optimum orientation being 45°. This arrangement results in completely effective atomization, while simultaneously precluding the spray from being overly or excessively dispersed, which may very easily occur if the angle of counter flow is chosen at random.

Thus, although the prior art seems to recognize some of the problems in this area, it is apparent that much remains to be done if a viable low volume sprayer system is to be provided. For example, a large volume of high-velocity air must be made available if a low volume sprayer system is to achieve its objective of total atomization of the spray together with a wide application swath; much more in fact, than prior art devices such as disclosed in U.S. Patent 2,356,950 appear to be capable of providing. At the same time, precise placement of the spray in a controlled pattern is vital if the spray is to be deposited in a relatively wide swath while simultaneously preventing damage to other plants by reason of excessive dispersal of the spray, as can easily happen if the prior art apparatus exemplified by Australian Patent 201,728 or U.S. Patent 2,677,576 is employed. Moreover, the sprayer system must be more versatile, that it is must be capable of performing more varied functions, than any of the prior art devices seem capable of performing.

Unless a system possesses the ability to provide all of the previously mentioned requisites, it is destined to be less than successful in its attempt to fully exploit the low volume technique; this appears to be the case as far as the known prior art devices are concerned.

The instant innovation fully exploits the potentialities of low volume spraying by applying a "total approach" to the solution of the aforementioned problems associated with the technique, Briefly, total exploitation is achieved by the employment of the following sprayer systems:

A power-driven fan or blower directs a stream of air through a duct to a plurality of air outlets which are in fluid communication with the duct. The air outlets communicate with the duct in one of the following ways: either through an elongated inflatable canvas sleeve approximately 40 ft. long, which is supported from a boom, or via a three-passageway manifold. Since the inflated sleeve is approximately 6″ in diameter, it is apparent that it is capable of conducting a large volume of air compared to the relevant prior art devices.

The system employs an agitating means to ensure that the non-diluted condition of the concentrate is maintained, assuming that the concentrate is in the form of suspension. The suspension is agitated by diverting a portion of the liquid which is pumped from the supply tank and recirculating it to the top of the tank, where it tends to cause turbulence, which results in a continual mixture of the solution.

There are two alternative methods of atomizing the liquid insecticide which is pumped from the supply tank through flexible tubing to a position adjacent to the discharging airstream.

In the first embodiment, the liquid is atomized by discharge from a plurality of injector or jet nozzles, which may be designated counter flow injector nozzles. As mentioned previously, the liquid spray interacts with the exiting airstream at an opposed acute angle preferably of 30° to 60° to the direction of airflow. In order to further ensure that precise control of placement of the spray is achieved, each of the air outlets has an attached air nozzle with a slightly flared and flattened discharge outlet which tends to precisely localize the issuing discrete airstreams. In this manner a herbicide can be sprayed on weeds without damage to nearby plants due to excessive dispersal.

In the second embodiment, a liquid spray is discharged via a plurality of rotating apertured chambers in fluid communication with conduits which are positioned within the air outlets, to a group of complementary rapidly rotating screen cages or centrifugal spinners which encase the nozzles. The screens are driven by the blower-induced airstream. The spray is centrifugally atomized and is deposited on the surrounding vegetation.

Both of these embodiments are interchangeable for use with either the elongated inflatable spray boom or the three-way manifold. While the combination of the counter flow injector nozzles and the elongated inflatable sleeve is considered to be a preferred embodiment, all of these combinations will result in an adequate swath width.

Each end of the elongated spray boom may be folded with respect to the central portion; thus, the boom is readily handled due to the foldable feature and the light weight of the collapsible canvas sleeve. Both the boom and tri-manifold are capable of being detachably mounted on a tractor, trailer or the like and are readily interchangeable with one another.

The three-way manifold system is capable of being clocked through 90°, thereby enabling the manifold conduits to be directed either at crops or upwardly at trees. In addition, there is provision for rotation of the fan housing itself about its axis in order that the angle of the manifold with respect to the ground may be varied. Similarly, in the elongated inflatable boom arrangement, both the angle with the ground and the height above the ground of the discharge nozzles may be varied.

Also, in the tri-manifold arrangement, if it is desired to achieve a more concentrated air blast from the fan, one or more of the manifold heads may be plugged with a suitable metallic cap and the airflow will then be directed solely or exclusively through the remaining open manifolds, thereby effectively increasing the velocity of the air blast.

It is apparent, therefore, that the present innovation provides a system for ensuring optimum utilization of the low volume technique. This is accomplished by adopting a "total approach solution" to the multi-faceted problem involved, consisting of an integrated system which successfully copes with each and every aspect of the problem by the employment of compact, interchangeable, easily handled elements. Special emphasis is placed on the provision of a large volume of air and on precise placement of the spray in a controlled pattern without excessive dispersal, in a fully atomized state, which is applied in a relatively wide swath.

In addition to the advantages mentioned above, other advantages of this innovation will become apparent in the more detailed description which follows. In the more detailed description of the invention, reference will be made to the accompanying drawings in which:

FIGURE 6 is a perspective view of the tri-manifold embodiment of the sprayer system, with a metallic cap over one of the manifold outlets.

DETAILED DESCRIPTION OF THE INVENTION

Figure 1:
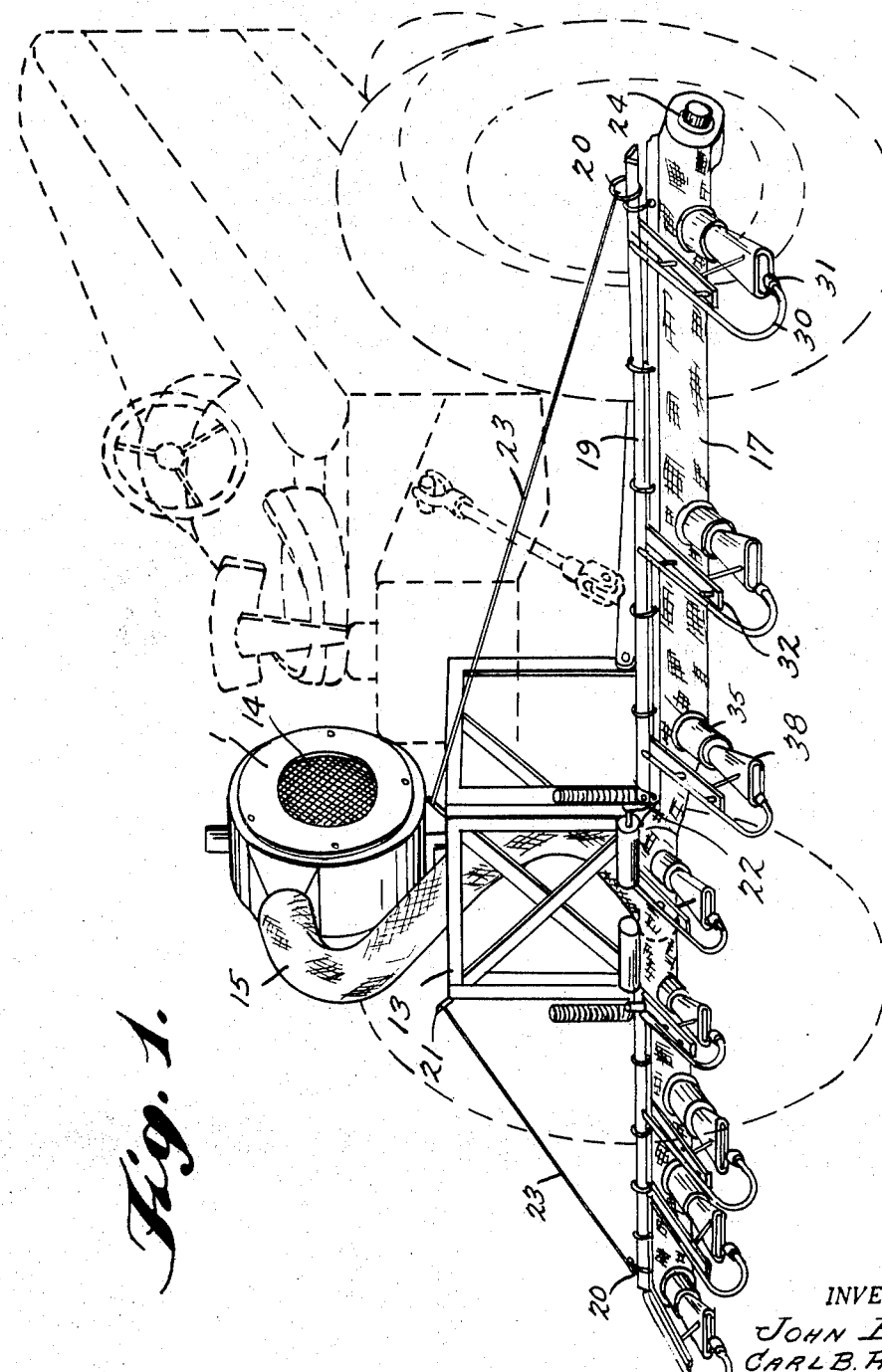
FIGURE 1 is an elevated perspective view of a tractor mounted inflatable spray boom embodiment of the sprayer system.
Figure 2:
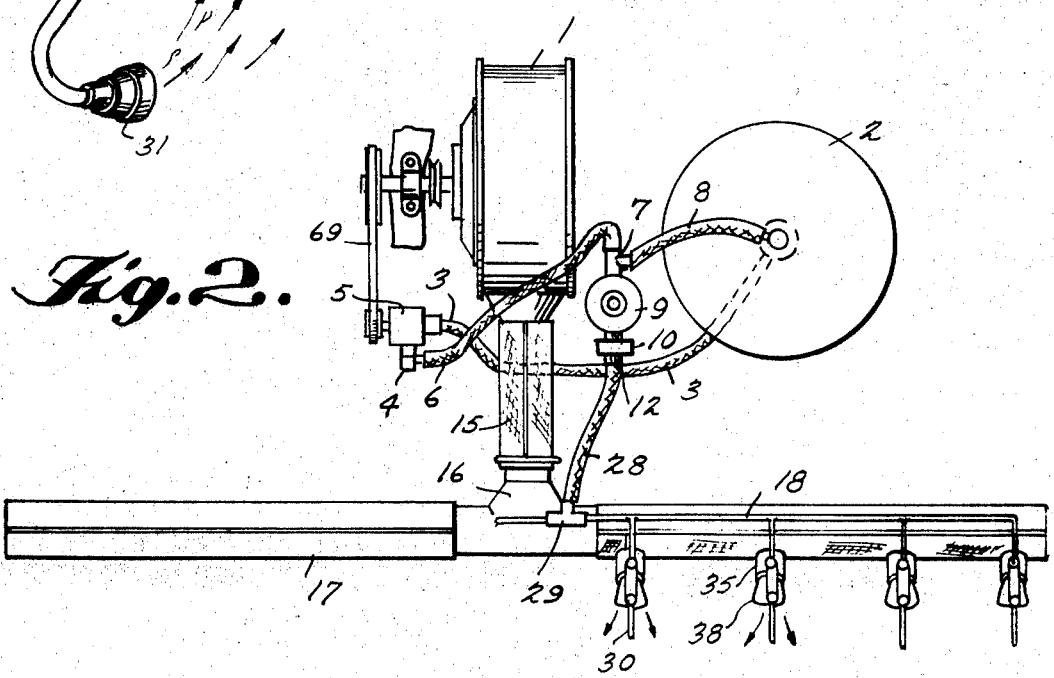
FIGURE 2 is a top plan view of the inflatable spray boom embodiment of the sprayer system which is adapted to be mounted on a tractor, including the supply tank, pump and associated tubing.

Referring to FIGURES 1, 2 and 6 of the drawings, the elongated inflatable spray boom embodiment and the tri-manifold arrangement are shown mounted on the rear of conventional tractor. When the sprayer system is mounted on a tractor, the fan or blower will be driven by the power take-off unit of the tractor. When the sprayer system is to be mounted on a trailer, the fan will be driven by an internal combustion engine which may be mounted on the trailer in a position convenient to the sprayer system.

A description of the structure and operation of the elements which are common to all of the embodiments will be presented, after which each of the embodiments will be discussed in detail. The fan, which is conventional in structure, is located within a fan housing 1 which is mounted on a stand 13, the stand 13 being attached in any convenient manner to the rear of the tractor. The fan is driven by a belt 68 which is connected either to a power take-off unit in the tractor-mounted version, or to an internal combustion engine when the trailer version is employed. Upon actuation of the fan, ambient air is drawn in through inlet screen 14 and propelled through air duct 15 to either the inflatable sleeve or the tri-manifold, depending on which particular embodiment is in use. The fan is designed to provide a relatively high volume of air at velocities in excess of 100 miles per hour. A supply tank or insecticide container 2, which is mounted on the stand 13 in any convenient manner, has a flexible tube 3, which may be composed of rubber or plastic, connected to the bottom thereof. The tube 3 is connected to a pump 5, which in turn is connected to a strainer 4, the function of the strainer being to prevent stoppage of the spray discharge nozzles by filtering foreign matter from the spray material.

The liquid is pumped from the tank 2 through strainer 4 by means of a conventional pump 5, which may be a centrifugal pump. The pump 5 is driven by belt 69 which is mounted on a pulley-shaft arrangement, which is driven by belt 68 from the power take-off shaft or the like. Pump 5 forces the liquid through flexible tube 6 to manifold or T 7. At T 7, the liquid supply is divided, a portion of the liquid being conducted through flexible tube 8 to the upper portion of supply tank 2. The liquid re-enters tank 2 with some force thereby causing turbulence and initiating a continuous agitation of the contents of the tank in order to insure that the spray concentrate remains in undiluted form, assuming that a chemical suspension is being used.

The remainder of the liquid which was divided at T 7 is conducted under pressure through pressure regulator 9 to flexible tube 11. A pressure gauge 10 is located in the line between pressure regulator 9 and flexible tube 11 in order to monitor the system pressure, which should be maintained at a minimum of 30 to 40 p.s.i. Pressure gauge 10 is in operative association with solenoid valve 12, in order to monitor and direct the liquid flow to a plurality of discharge nozzles. All of the aforementioned elements are conventional in structure and operation and may therefore be replaced by suitable equivalents. For example, a more rigid tubing such as copper tubing, would be an adequate substitute for flexible tubes 3, 6, 8 and 11. These tubes have a common function of conducting a supply of liquid to the liquid discharge nozzles; hence, they may be generically designated as supply tubes.

Referring specifically to FIGURES 1 and 2, the structure and operation of the elongated inflatable spray boom embodiment of the innovation will next be discussed in detail.

The fan is in fluid communication with an air duct or tube 15, which is attached or connected to the fan housing 1. The length of air duct 15 may be varied as desired in accordance with the different embodiments used, or the duct 15 may be eliminated entirely, as shown in the tri-manifold arrangement of FIGURE 6 of the drawings. Air duct 15 may be comprised of canvas or other suitable material. Attached to the opposite end of air duct 15 is a dividing manifold Y 16, which may be constructed of a suitable lightweight metal such as aluminum. The function of the dividing Y is to divide the airstream into two diverging components so that it may be allowed to flow throughout the length of an inflatable canvas sleeve 17 in order to be capable of laying down a relatively wide swath of spray. The diameter of the inflated sleeve is approximately 6" thus allowing a sufficiently large volume of air to be delivered to the respective air outlets 35. The sleeve is oriented parallel to the ground and parallel to the transverse axis of the tractor, may be constructed of a nylon canvas material, and is preferably plastic coated. Each end of the sleeve is plugged by a suitable cap or plug means 24 (see FIGURE 1).

Figure 3:
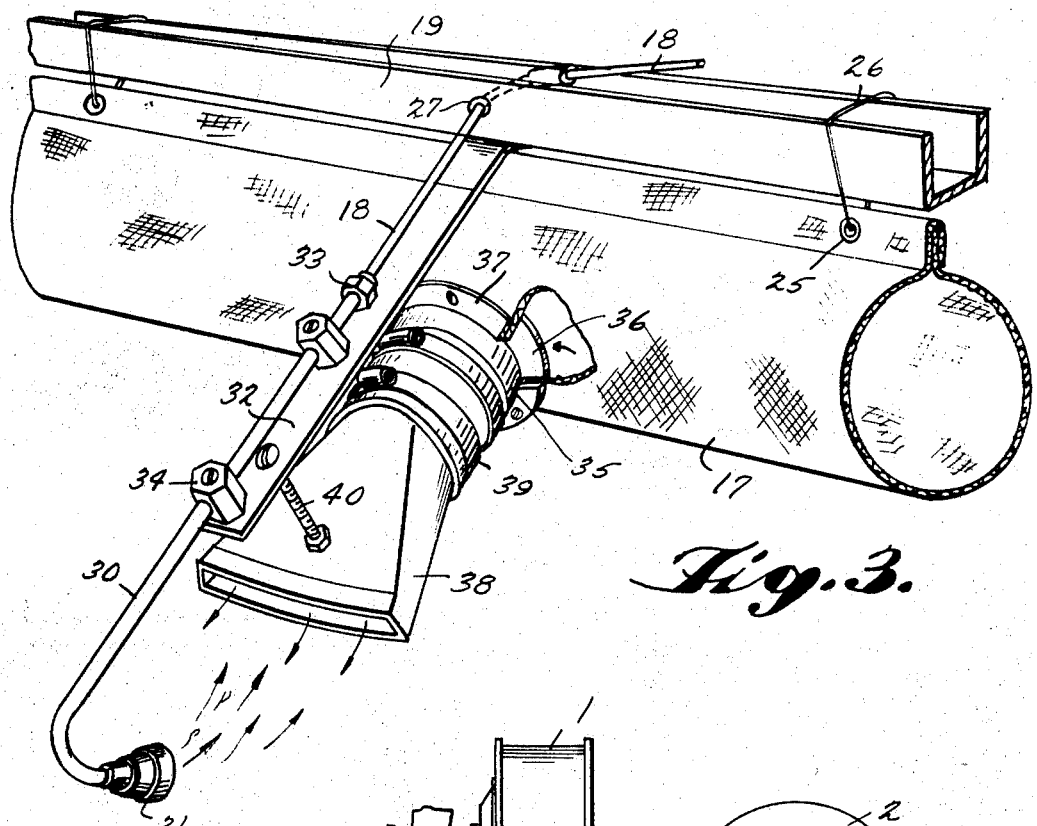
FIGURE 3 is a perspective view of the inflatable spray boom arrangement, including a close-up view of the air and counter flow injector nozzles and a sectional view of the support bar and inflatable sleeve.
Figure 4:
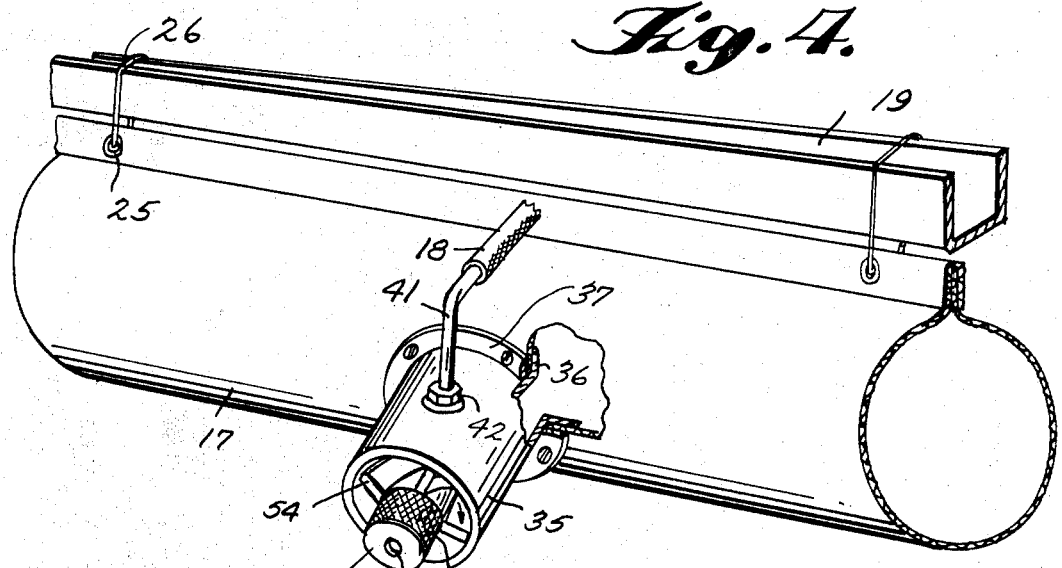
FIGURE 4 is a perspective view similar to that of FIGURE 3 except that a close-up view of the centrifugal spinner embodiment is shown in combination with the spray boom.

Referring to FIGURES 1 and 3, it is seen that sleeve 17 depends downwardly from an elongated U-shaped or channeled support frame or bar 19. Support frame 19 is constructed of a lightweight metal and is detachably hinged to the frame 13 at hinge point 22. FIGURE 4 shows in detail the manner in which the sleeve is secured to the support bar 19. Sleeve 17 possesses a plurality of spaced apertures or eyelets 25, through which a length of wire or nylon cord is drawn and secured around support frame 19.

In operation, the sleeve inflates after only a few revolutions of the fan, the fan having transmitted air through air duct 15 and dividing Y 16 to the sleeve 17. Upon inflation, a large volume of air is thereafter directed or discharged in the nature of a plurality of discrete airstreams through air outlets 35, at which point they interact with a relatively small amount of the liquid spray which is being introduced from the supply tank 2, and emitted from a plurality of counter flow injector nozzles 31.

The provision of an inflatable rather than a rigid metal sleeve has resulted in a lightweight structure which is very tolerant of mechanical abuse, is easy to support, is readily stored, and may be quickly mounted or demounted, a feature which is important to the "total approach" concept of the sprayer system.

Due to the length of the spray boom, it is desirable that the boom be as compact as possible in order to facilitate the mounting, demounting and general handling thereof. Accordingly, the present innovation provides for folding the respective end portions of the boom about a stationary intermediate portion. In order to accomplish this, a pair of cables or wire chains 23 are attached at one of their respective ends to a pair of pins 21 which are mounted on the frame 13, and at the other extremity are attached to the pair of rings 20, the rings in turn being secured to the outer extremities of the support frame 19.

In order to fold the boom, the hinge pins 22 are simply unlocked and the respective end portions of the boom are raised until they assume a position which is perpendicular to their normal operating position. Of course, the end portions could be folded in a plane parallel to rather than perpendicular to the ground, while remaining within the scope of the innovation. While the inflatable boom shown in FIGURE 1 will be folded and unfolded manually, it is apparent that power means could also be employed. For example, a fluid-actuated piston-cylinder arrangement could replace cables 23 in order to raise and lower the boom.

Thus, the elongated, inflatable sleeve spray boom presents a lightweight, compact, readily-handled structure which is also able to conduct a large volume of air and deposit a wide swath of spray, thereby satisfying three of the requisites to total exploitation of the ultra low volume spraying technique.

The present innovation provides two basic embodiments for achieving the atomization of the spray prior to deposition on vegetation. These embodiments will be termed the counter flow injector nozzle embodiment, and the centrifugal spinner embodiment. Each embodiment is adapted for use with either the inflatable spray boom or the tri-manifold.

Referring to FIGURES 2 and 3 of the drawings, a detailed disclosure of the counter flow injector nozzle embodiment is set forth. Air which is transmitted by the fan is directed through air duct 15 and divider 16 through sleeve 17 to a plurality of air outlets 35, which are spaced at intervals along the length of the sleeve 17. Air outlet 35 is composed of a cylindrical conduit or tube having an annular flange member 36 which is oriented at right angles to the main body of the air outlet. The flange 36 has a plurality of tapped, threaded holes spaced about its periphery. Air outlet 35 may be made of aluminum or similar material. In connecting the air outlets to the sleeve 17, the former are inserted from the open end of the sleeve through each of a plurality of holes which are cut in the canvas, after which the ends of the sleeve are closed by inserting plugs 24. Once inserted, the air outlets 35 are secured to the sleeve by means of a plurality of annular rings 37, each of the rings being secured to the flange member 36 by means of screws. Next, an air nozzle 38 one end of which is cylindrical in configuration, is slipped over the air outlet 35 and secured thereto by means of a pair of adjustable strap members 39. Air nozzle 38 is slightly flared and partially flattened at its discharge end in order to provide a precisely controlled, localized air flow discharge pattern. As mentioned previously, this configuration assists in providing a narrowly confined or localized pattern which preclude excessive dispersal, and is particularly helpful in protecting nearly plants when a weed killer is being used. The air outlet 35 and air nozzles 38 may be constructed of a lightweight metal such as aluminum or tin.

The liquid which is sprayed from pressure regulator 9 through solenoid valve 12 is conducted via flexible tube 28, which may be of rubber, plastic or the like to a manifold or T 29 where the flow is divided and conducted along the length of the spray boom by means of a plurality of flexible tubes 18. Tubes 18 may be constructed of plastic or the like. Each tube 18 is passed through one of a group of tapped holes 27 at spaced intervals along the frame 19. Holes 27 are located so that they are contiguous to the holes in the canvas sleeve 17 for the insertion of air outlets 35. After being passed through holes 27, tube 18 is threadedly engaged by means of a nut 33 with a J-shaped metal pipe conduit 30. Conduit 30, which may be a copper tube, passes through a pair of aligned hexagonal supports 34, said supports being secured to a ruler-like support bar 32. Support 32 is bolted to the underside of elongated support frame 19.

Pipe 30 is in operative association with air nozzle 38 since bar 32 is attached to air nozzle 38 by means of a bolt-nut arrangement 40.

An atomizing jet, or counter flow injector nozzle 31 is positioned on the discharge end of pipe 30. Counter flow nozzle 31 is conventional in structure and is oriented at an acute angle preferably from 30° to 60° with respect to the longitudinal flow axis of the air outlet, in a direction opposed to that of the air flow. As mentioned previously, after extensive analysis it has been found that maximum effective atomization is achieved by orienting the injector nozzle within the above range, with the optimum orientation being substantially 45°. This arrangement cooperates with the flared, flattened air nozzles 38 to secure complete atomization, while simultaneously preventing the spray from being overly or excessively dispersed, thus ensuring sweeping yet effective coverage. The distance between the discharge end of the air nozzle and the counter flow 31 is preferably approximately six inches.

The embodiment set forth above results in optimum effective atomization of the spray because it is, in effect, atomized twice: as the liquid is discharged from the nozzle 31 it is initially atomized; then, as the liquid vigorously interacts with the strong air blast or airflow which is being discharged from the air nozzles, further atomization of the spray occurs, while simultaneously avoiding excessive dispersal of the spray mixture.

Figure 5:
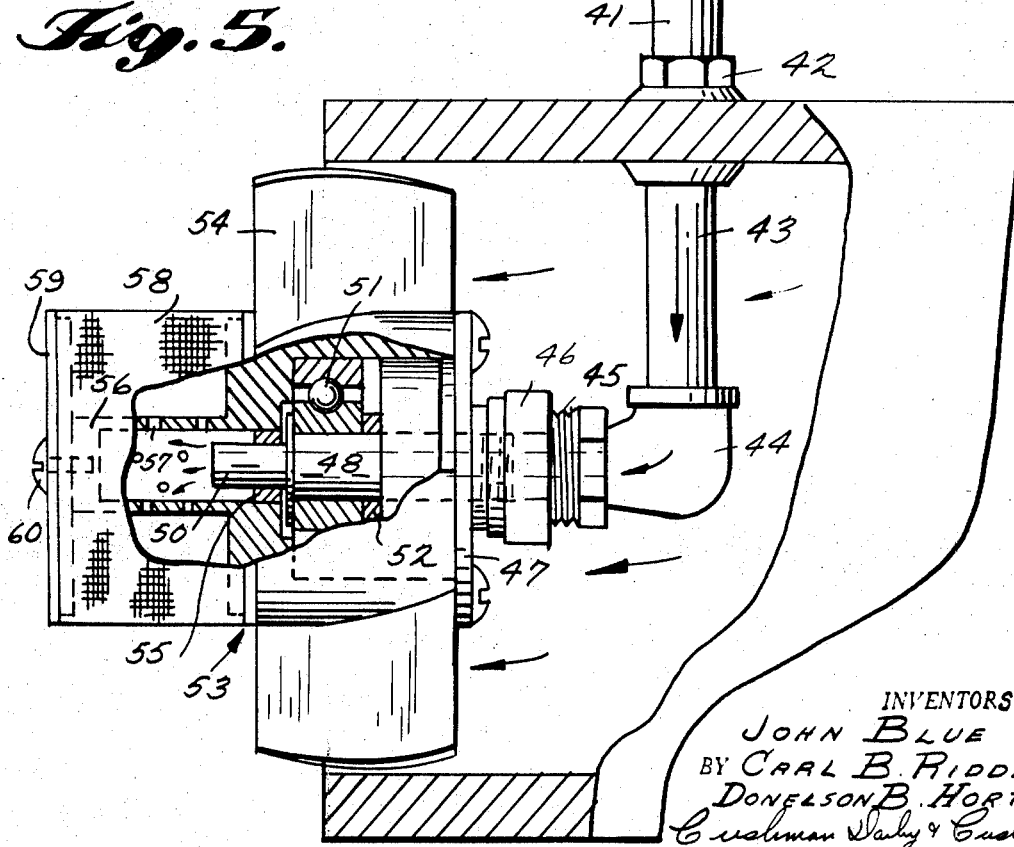
FIGURE 5 is a partially broken, partially cross-sectional view of the centrifugal spinner of FIGURE 4.

An alternative embodiment of the discharge system is disclosed in FIGURES 4 and 5 of the drawings. This system which may be termed a centrifugal spinner arrangement, is shown in conjunction with the inflatable spray boom embodiment. As mentioned previously, however, all of these embodiments are interchangeable with one another. Therefore, both the centrifugal spinner arrangement and the counter flow injector nozzle embodiment may be employed in conjunction with either the elongated spray boom, or with the tri-manifold arrangement.

Referring to the FIGURES 4 and 5, air nozzle 35 has a tapped hole in the upper wall thereof in order to receive an L-shaped pipe or conduit 41. Conduit 41, which may be a copper pipe, is in fluid communication with flexible tube means 18; conduit 41 discharges liquid through the tapped hole into a similar conduit 43 which is also inserted into the tapped hole. If desired, conduit 41 may be constructed so that it extends entirely down to elbow 44; if so, pipe 43 would, of course, be eliminated. Nut 42 secures conduit 41 to the wall of the air outlet means 35.

Referring specifically to FIGURE 5, conduit 43 is threadedly engaged with elbow 44. The outlet of elbow 44 is coaxially aligned with and connected to orifice member 46 by means of a threaded member 45, which is threaded both internally and externally. Coaxially aligned with orifice member 46 and threadedly secured thereto is a stationary shaft member 48. Shaft 48 is mounted within a hollow, rotatable propeller 53, and comprises a generally cylindrical hollow metal member. The inlet end of the stationary shaft is of reduced diameter and is externally threaded. A pair of bearings 51, which are separated by a spacer washer 52, are mounted on the central portion of the shaft 48. The bearings 51 are held within propeller 53 by a plate member 47, which is secured to the rear wall of the propeller 53 by means of a pair of bolts which are screwed into threaded holes in the wall of propeller 53. The forward end of the first inserted of the bearings 51 is secured by portions of the inner wall of the propeller and by an integral collar member 49 which is attached to the stationary shaft 48. The outlet of the hollow shaft 48 consists of a reduced pipe-like member 50. Reduced pipe 50 is sealed by a centrifugal seal 55 and is in fluid communication with a chamber 56 coaxially aligned therewith. Chamber 56 has a plurality of apertures or orifices 57 around the periphery thereof. A rotatable mesh screen 58 surrounds or encases the apertured chamber 56. Screen 58 is secured to chamber 56 by means of a plate 59 which is bolted thereto by screw 60. Screen 58 may be approximately 20 to 40 mesh. The objective is to obtain a particle size in the range of 80 to 100 microns; accordingly, any mesh which will achieve this objective is satisfactory. A particle size of 80 to 100 microns is considered ideal because smaller particle sizes present a problem with undue drift while larger particle sizes result in poor coverage.

In operation, the rotatable propeller is driven by the airflow from the fan impinging upon the propeller blades 54 as the airstream is discharged from the air outlets 35. This is depicted in FIGURE 5 by the arrows pointing from right to left within the air outlets 35. Simultaneously, liquid is pumped from the tank 2 through flexible tubes 18, 41, 43 and elbow 44 to stationary shaft 48, after which it enters chamber 56 through pipe 50. The spray is then centrifuged outwardly through the plurality of peripheral orifices 57 onto the rapidly rotating screen 58, which is rotating at a speed of approximately 6,000 to 8,000 revolutions per minute. The spray is deposited in the interstices of the mesh screen, after which it is centrifugally introduced into the airstream with a component of force, after which it is dispersed on the vegetation to be sprayed. While the aforedescribed apparatus for discharging the spray is dissimilar to the counter flow injector nozzle structure, it has been found to be equally effective as far as degree of atomization is concerned.

Referring now to FIGURE 6, an alternative embodiment for the discharge of the airflow is set forth. A three passageway manifold, which may be termed a tri-manifold, is shown in operative association with the counter flow injector nozzle embodiment for the discharge of the spray. The tri-manifold is constructed of a two piece metal casting, the metal used being aluminum, copper, or the like. The tri-manifold consists of a plurality of air passageways or outlets which may, of course, vary in number; each of the outlets may be cylindrical in configuration. The opposite end of the tri-manifold is comprised of a square flange which is shaped so as to mate with or slip over the square outlet of the fan housing 1. The tri-manifold is split into two parts along its longitudinal axis, and the assembled tri-manifold is secured by a plurality of thumbscrews 64.

In operation, the fan transmits air through the fan housing outlet to the tri-manifold, whence it is discharged through one or more of a plurality of air outlets 63. If desired, an internal baffle (not shown) may be positioned within the body of the tri-manifold in order to more effectively control the flow of air therethrough. As the air is being discharged through the manifold outlets 63, liquid is being supplied from tank 2 through connected tubing to solenoid valve 12 and then through J-shaped pipes 30 to jet nozzles 31. At this point, the material is discharged from the jet nozzle 31 at an opposed acute angle, preferably of 30° to 60° to the direction of airflow with an optimum orientation of 45°, and the two vigorously interact with one another in order to completely atomize the spray prior to deposition on the vegetation.

If one desires to spray trees, the tri-manifold may be clocked or rotated 90 degrees about its longitudinal axis by merely loosening the thumbscrews 64 and manually removing and turning the tri-manifold so that the air outlet heads 63 are now oriented in a direction perpendicular to, rather than parallel with, the ground. The thumbscrews 64 are then tightened and the system is ready for operation.

Also, if it is desired to achieve a more concentrated air blast from the fan, one or more of the air outlet heads 63 may be closed with a suitable cup-like element or metallic cap 65, and the airflow will then be directed solely or exclusively through the remaining open air outlets, thereby effectively increasing the intensity of the air blast. The metallic cap 65 possesses an inner periphery which is greater than the outer periphery of the air passageway 63 so that the cap-like element 65 slips over and encloses the airstream outlet of the passageway. If desired, the metallic cap 65 may be internally threaded, and the air outlets 63 may be provided with mating external threads so that the cap could be screwed onto the air outlets.

In addition, due to the manner in which it is mounted the fan housing 1 may be rotated about its axis through approximately 180°. The fan housing is mounted between a pair of opposed mounting plates 66, one of which is shown in FIGURE 6. The mounting plates are clamped to the fan housing by means of bolts 67 which are threaded through mated holes in the fan housing. Thus, in order to rotate the fan housing, one simply loosens the bolts, rotates the fan housing to the desired position and retightens the bolts, after which the system is ready for operation. Similarly, if desired, both the angle with the ground and the height above the ground of the discharge nozzles in the inflatable boom embodiment may be adjustable in order to vary the spray pattern of the system. This may be accomplished by adjustably mounting the support frame 19 on a pair of vertical guideways (not shown) which could be secured to frame 13, thus varying the height of the boom above the ground. The angle of discharge with the ground could be varied by connected suitable actuating means, such as a hydraulic cylinder, between support frame 19 and support bar 32 (not shown).

The inflatable spray boom arrangement and the tri-manifold embodiment may be readily interchanged as desired. For example, assuming that the tri-manifold arrangement is mounted on a tractor and it is desired to substitute the inflatable spray boom embodiment, one would simply loosen the thumbscrews 64 and remove the tri-manifold from the fan outlet head. Then the air duct 15 would then be secured by any suitable means on the outlet head of the fan housing 1. Next the Y fitting 16 and sleeve 17 of the inflatable boom would be secured to air duct 15, the hinge pins 22 positioned and locked and the cables secured in place between rings 20 and pins 21. As soon as the flexible tubing 18 had been set up, the device would be ready to operate.

In most ground-oriented or vehicle-mounted uses, any one of the four afore-mentioned combinations could be used. When it is desired to spray trees, it is preferred to use the tri-manifold arrangement due to the more concentrated spray pattern which is emitted particularly since the tri-manifold may be clocked and/or the fan housing may be rotated, together with the option of intensifying the air blast by closing an air outlet with cap 65.

It is apparent therefore, that the present innovation provides a system for insuring optimum employment of low volume spraying techniques. The adoption of a "total approach" solution to the several problems involved, consisting of an integrated system which solves every aspect of the problem by the employment of compact, interchangeable, readily-handled elements, is in large measure responsible for the success of the present innovation.

Although the sprayer system and its operation has been described with reference to several specific embodiments, it will become apparent to those skilled in the art that variations can be made in the sprayer system.

What is claimed is:
1. A low volume sprayer system comprising:
 a fan or blower means, for the generation of a stream of air,
 a fan-drive means connected thereto,
 a duct means in fluid communication with said fan means, for the transmission of said generated stream of air,
 a supply tank means, for storage of the material to be sprayed,
 a tube means connected thereto, for the transmission of the material to be sprayed,
 a pump means in fluid communication wtih said tube means such that said pump means is capable of causing the transmission of said material to be sprayed through said tube means,
 an elongated inflatable sleeve means in fluid communication with said duct means, said sleeve means being closed at each end such that a stream of air can flow through the sleeve means,
 said sleeve means having a plurality of outlet means attached thereto, for the discharge of the airstream which is transmitted through said sleeve means, and
 each of said outlet means having affixed thereto a conduit means, said conduit means being in fluid communication with said pump means such that the material to be sprayed is discharged through said conduit means, said conduit means each having a discharge nozzle positioned relative to a respective airstream for introducing the material into the airstream with a component of force, whereby the introduced material is atomized prior to deposition on vegetation to be sprayed.

2. The low volume sprayer system of claim 1 including:
 each of said conduit means having a jet nozzle means connected to the discharge end of said conduit means, and
 said nozzle means being oriented at an angle of substantially 30°–60° with respect to the longitudinal axis of said air outlet means, in a direction opposed to the direction of flow of said airstream, so that material discharged from said nozzle means into said airstream is completely atomized, but is not excessively dispersed, prior to deposition on vegetation to be sprayed.

3. The low volume sprayer system of claim 2 in which:
said nozzle means are oriented at an acute angle of substantially 45° with respect to the longitudinal axis of said air outlets, in a direction opposed to the direction of flow of said airstream.

4. The low volume sprayer system of claim 1 wherein:
said outlet means includes a rotatable screen cage, said conduit means being in fluid communication with said screen cage, said screen cage being driven by said fan means in order to centrifugally atomize the material to be sprayed prior to deposition on the vegetation.

5. The low volume sprayer system of claim 1 including:
agitating means connected to said tank means, in order to ensure that the material to be sprayed remains in a concentrated, undiluted condition.

6. The low volume sprayer system of claim 5 wherein:
said agitating means comprises a hose which is in fluid communication at one end with said pump means and at its opposite end with said tank means, such that a portion of the material to be sprayed is recirculated to said tank means, thereby agitating the material to be sprayed.

7. In a low volume sprayer system, including a driven fan, an air duct in communication therewith, a supply of material to be sprayed, and a pump to cause said material to be transmitted through a supply tube in communication with said supply, and an inflatable spray boom comprising:
a support frame means,
an inflatable sleeve means connected thereto, said sleeve means being closed at both ends and in fluid communication with said air duct, so that a relatively large volume of air may be conveyed through said sleeve means,
a plurality of outlet means spaced along the length of said sleeve means and in communication with said sleeve means for discharging discrete streams of air from said sleeve means, and
a plurality of conduit means corresponding to the number of outlet means, said conduit means being in fluid communication with said supply tube for transmitting and discharging relatively small quantities of the material to be sprayed into each of said discrete airstreams, said conduit means each having a discharge nozzle positioned relative to a respective airstream for introducing the material into the airstream with a component of force whereby the introduced material is atomized prior to deposition on vegetation to be sprayed.

8. The inflatable spray boom of claim 6 wherein said sleeve means is comprised of nylon canvas.

9. The inflatable spray boom of claim 8 in which said nylon canvas sleeve means is plastic-coated.

10. The inflatable spray boom of claim 7 in which each end segment of said boom may be folded relative to an intermediate segment of the boom.

11. The inflatable spray boom of claim 7 wherein:
each discharge nozzle of said conduit means comprises a jet nozzle means connected to the discharge end of said conduit means, said nozzle means being oriented at an acute angle with respect to the longitudinal flow axis of the airstream issuing from said air outlet means, and in a direction opposed to the direction of flow of said airstream, so that material discharged from said nozzle means into said airstream is completely atomized, but is not exessively dispersed, prior to deposition on vegetation to be sprayed.

12. The inflatable spray boom of claim 11 wherein:
said nozzle means is oriented at an angle of 30° to 60°.

13. Inflatable spray boom of claim 7 in which:
said outlet means includes a rotatable screen cage, said conduit means being in fluid connection with said screen cage, said screen cage being driven by said fan means in order to centrifugally atomize the material to be sprayed prior to deposition on the vegetation.

14. In a low volume sprayer system, including a fan, an air duct in fluid communication therewith, a fan driving means, a supply of material to be sprayed and a pump to cause said material to be transmitted through a tube in fluid communication with said supply:
a plurality of air outlet means in fluid communication with said air duct, for the discharge of an airstream which is transmitted through said air duct,
each of said outlets having a conduit means in operative association therewith, said conduit means being in fluid communication at one end with said tube, and having a jet nozzle means connected to the opposite end of said conduit means, and
said nozzle means being oriented at an acute angle of 30°–60° with respect to the longitudinal axis of said air outlet means, in a direction opposed to the direction of flow of said airstream, for the purpose of ensuring that material discharged from said nozzle means into said airstream is completely atomized, but is not excessively dispersed, prior to deposition on vegetation to be sprayed.

15. The low volume sprayer system of claim 14 in which:
said nozzle means are oriented at an acute angle of substantially 45° with respect to the longitudinal axis of said air outlets, in a direction opposed to the direction of flow of said airstream.

16. The low volume sprayer system of claim 14 in which:
said plurality of air outlet means comprises a three-passageway manifold.

17. The low volume sprayer system of claim 16 in which at least one of said passageways is adapted to be closed so that the airstream will be discharged solely through the remaining passageways, for the purpose of intensifying the air blast issuing therefrom, in order to more effectively deposit the atomized spray on said vegetation.

18. The low volume sprayer system of claim 17 wherein:
said passageway is closed by positioning a cup-like element over the outlet end of said passageway, said cup-like element having an inner periphery which is greater than the outer periphery of said passageway so that said cup-like element slips over and encloses the airstream outlet of said passageway.

19. The low volume sprayer system of claim 16 wherein said three-passageway manifold is rotatable through a 90° angle about its longitudinal axis, for the purpose of spraying elevated vegetation such as trees.

20. The low volume sprayer system of claim 14 in which:
said plurality of air outlet means comprises an elongated inflatable sleeve,
said sleeve having a plurality of air nozzles connected thereto, for the discharge of an airstream which is transmitted through said air duct.

References Cited

UNITED STATES PATENTS

| | | | |
|---|---|---|---|
| 2,297,110 | 9/1942 | Parker | 239—77 |
| 2,356,950 | 8/1944 | Root | 239—77 |
| 3,398,893 | 8/1968 | Missimer et al. | 239—77 |

FOREIGN PATENTS 1,194,031  11/1959  France.

ALLEN N. KNOWLES, Primary Examiner